United States Patent [19]

Wood

[11] Patent Number: 5,677,599
[45] Date of Patent: Oct. 14, 1997

[54] CIRCUIT FOR DRIVING AN ELECTROLUMINESCENT LAMP

[75] Inventor: Grady McConnell Wood, Melbourne, Fla.

[73] Assignee: Harris Corporation, Palm Bay, Fla.

[21] Appl. No.: 613,381

[22] Filed: Mar. 7, 1996

[51] Int. Cl.$^6$ .................................................. H05B 37/00
[52] U.S. Cl. .............................. 315/169.3; 315/209 R; 315/224; 315/226
[58] Field of Search .......................... 315/169.3, 224, 315/226, 209 R, 200 R, 219, 291, 362, 283

[56] References Cited

U.S. PATENT DOCUMENTS

| | | | |
|---|---|---|---|
| 4,527,096 | 7/1985 | Kindlmann | 315/169.3 |
| 5,172,032 | 12/1992 | Alessio | 315/169.3 |
| 5,313,141 | 5/1994 | Kimball | 315/169.3 |

*Primary Examiner*—Robert Pascal
*Assistant Examiner*—David Vu
*Attorney, Agent, or Firm*—Jaeckle, Fleischmann & Mugel, LLP

[57] ABSTRACT

A circuit for repeatedly switching current through an inductor for driving an electroluminescent lamp at alternating voltage levels having both peak positive and peak negative polarities. This circuit includes a circuit path having two zener diodes in series connection with the lamp. These zener diodes each have an anode and a cathode, and a breakdown voltage, and may have either their anodes, or cathodes connected together. These zener diodes cause conduction along the circuit path in a first direction when a positive voltage driving the lamp exceeds the breakdown voltage of a first of the two zener diodes to provide a peak detection signal representing that the lamp has reached the peak positive polarity voltage level. Further, these zener diodes cause conduction along the circuit path in a direction opposite the first direction when a negative voltage driving the lamp exceeds the breakdown voltage of a second of the two zener diodes to provide a peak detection signal representing that the lamp has reached the peak negative polarity voltage level. The circuit has a polarity control circuit coupled to the circuit path. This control circuit switches the polarity of the voltage driving the lamp to a negative polarity in response to the positive peak detection signal and switches the polarity of the voltage to the lamp to a positive polarity in response to the negative peak detection signal.

9 Claims, 2 Drawing Sheets

CIRCUIT FOR DRIVING AN ELECTROLUMINESCENT LAMP

FIELD OF THE INVENTION

The present invention relates to a circuit for driving an electroluminescent (EL) lamp.

BACKGROUND OF THE INVENTION

EL lamps are used as light sources in miniature applications, such as wrist watches. These lamps have phosphor which glows when an AC voltage is applied. The AC voltage is supplied by an inverter circuit. The inverter circuit supplies a high AC voltage, such as 100 volts peak to peak, at low alternating frequencies of about 60 to 1,000 Hz. Examples of inverter circuits are described in U.S. Pat. No. 5,313,141 issued May 17, 1994 to R. A. Kimball, and U.S. Pat. No. 4,527,096 issued Jul. 2, 1985 to Kindlmann.

In EL-lamp miniature applications, the inverter circuit is implemented on an integrated chip (IC), and thus must operate on a very low voltage battery, typically one to three volts. To obtain the necessary high AC voltage levels to operate the EL-lamp, the inverter circuit has an inductor through which current is repeatedly switched on and off at a high frequency, such as 8–100 kHz. The inductor in response produces a high voltage which the circuit applies to the EL-lamp. The inverter circuit generally has switches, typically transistors, which operate at a lower frequency, such as 60–1,000 Hz, to control the electrical connection between the inductor and the EL-lamp in concert with the alternating high voltage polarity.

The inverter circuit described above requires two clock signals, one operating at a high frequency to switch the inductor and the other at a low frequency to control voltage polarity. To generate the clock signals, typical wristwatch inverter circuits use an external clock input signal from a timekeeping chip, usually at 32 kHz, which is amplified and then divided down to two usable frequencies. The 32 kHz clock signal is divided down by a series of divider circuit stages. Each divider stage can divide the frequency by two, and generally requires six logic gates. For example, to generate 8 kHz and 250 Hz signals, the 32 kHz signal may be applied to two divider stages to obtain an 8 kHz signal, and then to four more divider stages to obtain a 250 Hz signal. Thus, six divider stages are needed, which requires a total of 36 gates. The number of gates can be reduced by having the timekeeping chip operate at 8 kHz and applying it to only four divider stages. Nevertheless, the added gates needed to implement the divider circuits increase the size and complexity of the IC, thereby increasing IC chip fabrication costs. In addition, an amplifier is needed to amplify the 32 kHz signal prior to dividing down, which can cause a power drain on the battery. To accommodate this power drain, a higher capacity battery may be required, which also increases the cost and size of the circuit.

Alternatively, two separate internal oscillators, a low frequency oscillator and a high frequency oscillator, can be used to provide the two clock signal frequencies needed to operate the inverter circuit. These oscillators typically require capacitors external to the IC to control the frequency. The need for a low frequency oscillator, in addition to a high frequency oscillator, still increases the number of devices needed to implement the inverter circuit, thereby also increasing the cost and size of the IC. Moreover, the required external capacitors also increase the cost of the overall implementation of the inverter circuit. Accordingly, it is desirable to have an inverter circuit which requires neither a separate low frequency clock signal in addition to a high frequency clock signal, nor external capacitors.

Further, typical inverter circuits control the low frequency clock signal to maintain constant the frequency of the AC output voltage applied to the EL-lamp. As the battery is discharged with use, the frequency of the output voltage remains essentially constant while the peak to peak output voltage decreases as the battery nears the end of its life. Further, as the battery nears the end of its life, this decreasing peak to peak output voltage results in a reduction in the brightness of the EL-lamp. However, maintaining the frequency of the AC output voltage increases the complexity and fabrication cost of the IC, because of the additional circuitry needed to produce the separate low frequency clock signal, as described above.

SUMMARY OF THE INVENTION

Accordingly, an object of the present invention is to provide an improved circuit for driving an EL-lamp which eliminates the need to input a low frequency signal to an inverter circuit.

Another object of the present invention is to provide an improved circuit for driving an EL-lamp which maintains a relatively constant AC voltage, peak to peak, to the EL-lamp as the battery in the EL-lamp application runs down.

It is still another object of the present invention to provide an improved circuit for driving an EL-lamp which provides the EL-lamp with excellent brightness characteristic while reducing the number of devices needed to implement the circuit as compared with prior art circuits for driving an EL-lamp, thereby simplifying implementation and reducing the cost of IC manufacturing.

Briefly described, the present invention provides a circuit for repeatedly switching current through an inductor for driving an electroluminescent lamp at alternating voltage levels having both peak positive and peak negative polarities. This circuit includes a circuit path having two zener diodes in series connection with the lamp. These zener diodes each have anode and cathode terminals, and a breakdown voltage. These zener diodes also have a pair of identical terminals connected together. These zener diodes cause conduction along the circuit path in a first direction when a positive voltage driving the lamp exceeds the breakdown voltage of a first of the two zener diodes to provide a peak detection signal representing that the lamp has reached the peak positive polarity voltage level. Further, these zener diodes cause conduction along the circuit path in a direction opposite the first direction when a negative voltage driving the lamp exceeds the breakdown voltage of a second of the two zener diodes to provide a peak detection signal representing that the lamp has reached the peak negative polarity voltage level. The circuit also has a polarity control circuit coupled to the circuit path. This control circuit switches the polarity of the voltage driving the lamp to a negative polarity in response to the positive peak detection signal and switches the polarity of the voltage to the lamp to a positive polarity in response to the negative peak detection signal.

BRIEF DESCRIPTION OF THE DRAWING

The present invention will be better understood and appreciated more fully from the following detailed description, taken in conjunction with the accompanying drawing, in which.

DETAILED DESCRIPTION OF THE INVENTION

Figure 1:
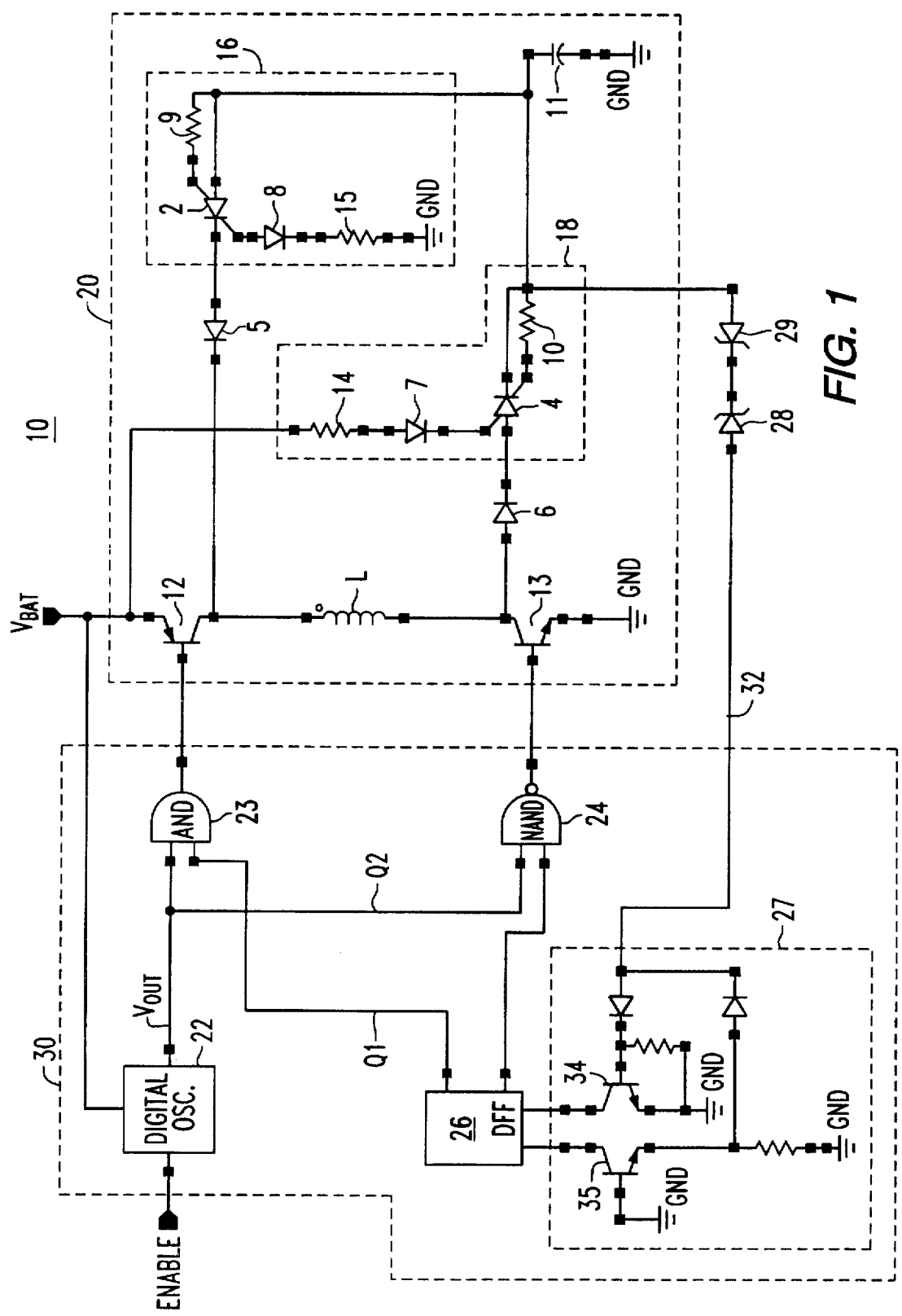
FIG. 1 is a schematic diagram of a circuit embodying the present invention.

Referring to FIG. 1, there is shown a circuit 10 of the present invention. Circuit 10 has a switching circuit 20 which is interconnected with a polarity control circuit 30. Switching circuit 20 switches current through an inductor L for driving an electroluminescent lamp 11 with an alternating voltage. A circuit path 32 couples circuits 20 to 30 and feedback signals to the polarity control circuit 30. Polarity control circuit 30 in response to these signals alternates the polarity of the AC voltage to lamp 11 driven by switching circuit 20. Circuit 10 and its operation are described in more detail below.

The switching circuit includes a PNP transistor 12 and a NPN transistor 13, which are connected in series with inductor L across the supply terminal (VBAT) of a battery (not shown in FIG. 1 ) and the ground terminal (gnd). The base of transistors 12 and 13 provide input lines which receive signals from polarity control circuit 30, which will be described later. Also included in switching circuit 20 are switches 16 and 18 for controlling the direction of charging and discharging current to lamp 11. Lamp 11 is represented as a capacitive load in FIG. 1. Switch 16 is coupled via diode 5 between one side of the inductor and lamp 11, while switch 18 is coupled with diode 6 between the second terminal of inductor L and lamp 11. Diode 5 and diode 6 protect switch 16 and switch 18, respectively, from the high voltage transients produced by inductor L. Switches 16 and 18 are auto-triggering SCRs 2 and 4, respectively. SCR 2 switches on in response to a negative going voltage transition pulse at the positive end of inductor L which is caused by turning off transistor 12. SCR 4 switches on in response to a positive going voltage transition pulse at the negative end of inductor L which is caused by turning off transistor 13. In addition to SCR 2, switch 16 has additional components of resistors 9 and 15, and diode 8. Also, switch 18 has additional components of resistors 10 and 14 and diode 7. The operation and components of switches 16 and 18, including SCRs 2 and 4, are described in application Ser. No. 08/490,016, filed Jun. 13, 1995 by the same inventor as this application, which is herein incorporated by reference.

The operation of switching circuit 20 is generally the same as the inverter circuit shown in FIG. 6 of the Kimball Patent, except switching circuit 20 uses auto-triggering SCRs 2 and 4 which do not require the application of a low frequency signal to control their operation.

Polarity control circuit 30 has a set-reset flip-flop circuit 26 having set (S) and reset (R) inputs, and outputs $\overline{Q}$ and Q to provide output signals Q1 and Q2, respectively. Output signal Q2 is the opposite of output signal Q1. Polarity control circuit 30 also has a triggering circuit 27 coupled to lamp 11, via circuit path 32, and connected to the set and reset inputs of flip-flop 26. Triggering circuit 27 includes two NPN transistors 34 and 35 which provide level shifting of feedback peak detection signals, via circuit path 32, appropriate to trigger the flip-flop 26 at its set and reset inputs. Circuit 27 and the peak detection signals are described in more detail later in the discussion of circuit 10 operation.

Circuit 10 also includes a digital oscillator 22 which is powered by VBAT from the battery and enabled by an ENABLE signal. Oscillator 22 provides an output signal Vout to polarity control circuit 30, as described below. Vout is a non-symmetrical output signal with a longer on time than off time. The frequency of oscillator 22 is set at 6 to 20 kHz, depending on the IC fabrication process used and the end application of lamp 11 with circuit 10. Oscillator 22 may be considered part of polarity control circuit 30, as shown in FIG. 1, or as in input to the polarity control circuit 30.

Interconnected with oscillator 22 and flip-flop 26 are AND gate 23 and NAND gate 24. Each gate 23, 24 has two inputs and one output representing the logical operation performed by the gate on its inputs. The output of AND gate 23 is connected to the base of transistor 12, while the output of the NAND gate 24 is connected to the base of transistor 13. AND gate 23 receives the output signal from Q1 at one of its inputs and Vout at its other input. NAND gate 24 receives the output signal from Q2 at one of its inputs and Vout at its other input.

Circuit path 32 couples triggering circuit 27 of polarity circuit 30 to lamp 11. Circuit path 32 has two zener diodes 28 and 29, which are connected in series between lamp 11 and input circuit 27 with their anodes connected together. The cathode of zener diode 29 connects to lamp 11 while the cathode of zener diode 28 connects to input circuit 27. Alternatively, zener diodes 28 and 29 may have their cathodes connected together and their respective anodes connected to input circuit 27 and lamp 11. Each zener diode 28 and 29 has a breakdown voltage. Preferably, the breakdown voltage of the two zeners 28 and 29 are the same in order to minimize the DC component of the voltage applied to load 11. In circuit 10 implementation, the zener voltages available in any given IC fabrication process may be limited. Therefore, each zener diode may be formed by a series of more than one zener diodes. The final breakdown voltage is then the sum of the zener diode voltages in series plus the forward diode voltages of the zener diode(s) connected in the opposite polarity.

Flip-flop 26 in circuit 10 may be simpler than standard flip-flop circuits, and the particular implementation of the flip-flop depends on the fabrication process chosen for the implementation of the IC EL driver chip. An example of an implementation of flip-flop 26 will be described later in connection with FIG. 2.

The signal pulses for operating circuit 10 of FIG. 1 may be described by FIG. 7 of the Kimball Patent whereby: Signal B represents Vout from oscillator 22, except Vout is not symmetrical, as described above. Signal A represents Q1 and $\overline{A}$ represents Q2. The output signal from AND 23 to transistor 12 is represented by X and the output signal form NAND 24 to transistor 13 is represented by Y.

The operation of the circuit 10 is as follows: Assuming an initial state for flip-flop 26 with Q1=0 (low) and Q2=1 (high), the output of AND gate 23 is always 0 (low), which turns on transistor 12 to connect VBAT to inductor L, and the output of NAND gate 24 follows Vout, thereby switching transistor 13 on and off with each Vout cycle. This operates switching circuit 10 to store positive voltage levels on lamp 11. Note that since Vout is a non-symmetrical signal, the on time for transistor 13 is longer than its off time for each cycle of Vout. Each time Vout completes one cycle, inductor L produces a voltage which charges lamp 11 through switch 18 and the voltage on lamp 11 has a positive step increase. The positive voltage level increases in these steps on lamp 11, but each step is about half the previous step. Thus, the capacitance of lamp 11 stores this voltage as a positive stair-case.

When the voltage level on lamp 11 has exceeded the breakdown or zener voltage of zener diode 28, the desired peak positive voltage level of lamp 11, a positive peak detection signal or pulse is carried through zener diodes 28 and 29 of path 32 to triggering circuit 27. In triggering circuit 27, the positive peak detection signal provides a current flow into the base of NPN transistor 34 causing it to turn on and pull the reset input of flip-flop 26, which is connected to the collector of transistor 34, to a low state, thereby reseting the flip-flop. This reseting of flip-flop 26 changes Q1 to 1 (high) and Q2 to 0 (low). Now, the output of NAND gate 24 is always 1 (high), which turns on transistor 13 to connect inductor L to gnd, and the output of AND gate 23 follows Vout, thereby switching transistor 12 on and off with each Vout cycle. This reverse the polarity of the voltage applied by switching circuit 20 to lamp 10 to negative. Note that since Vout is a non-symmetrical signal, the on time for transistor 12 is longer than its off time for each cycle of Vout. For each cycle of Vout, inductor L produces a voltage which discharges lamp 11 through switch 16 and the voltage on lamp 11 has a step negative voltage increase. Thus, with successive cycle of Vout, the negative voltage level increases in steps on lamp 11, but the size of each step is about half of the previous step. The capacitance of lamp 11 stores the voltage as a negative stair-case.

When the voltage level on lamp 11 has exceeded the breakdown or zener voltage of zener diode 29, the desired peak negative voltage level on lamp 11, a negative peak detection signal or pulse is carried through the zener diodes 28 and 29 of path 32 from triggering circuit 27. In triggering circuit 27, the negative peak detection signal pulls the emitter of the NPN transistor 35 below ground causing base current to flow into its base which is connected to ground. This causes the collector of NPN transistor 35, which is connected to the set input of flip-flop 26, to go to a low state, thereby causing flip-flop 26 to return to its set state. This return to set state in flip-flop 26 changes Q1 to 0 (low) and Q2 to 1 (high). Switching circuit 20 then begins driving lamp 11 to a positive voltage level, as already described, and the above repeats until the ENABLE signal to oscillator 22 is removed.

Circuit 10 maintains a relatively constant positive peak to negative peak AC voltage level, such as 138 volts, across EL-lamp 11, and allows the frequency to vary as the battery powering circuit 10 and high frequency oscillator 22 runs down. This achieves the same result as the prior art circuit for driving an EL-lamp which maintain a relatively constant frequency, because the brilliance of the EL-lamp is relatively linear with both voltage and the frequency applied to the lamp. Thus, when either voltage or frequency is maintained relatively constant as the battery runs down, the decrease rate of the brilliance of the EL-lamp will be the same. However, maintaining a relatively constant AC voltage does not require the additional prior art components needed to generate a low frequency signal, thereby reducing the cost, complexity and size of IC chip implementation. For example, the IC chip size reduction may be from 4,600 mills, using the dual oscillator prior art approach, to about 2,400 mills, which is about a 50% reduction. The actual area savings in IC chip size will vary depending on the IC fabrication process used to implement circuit 10. This is because the present invention, rather than requiring a second low frequency signal, uses the voltage level on lamp 11 to switch polarity of the current being switched repeatedly though inductor L.

Figure 2:
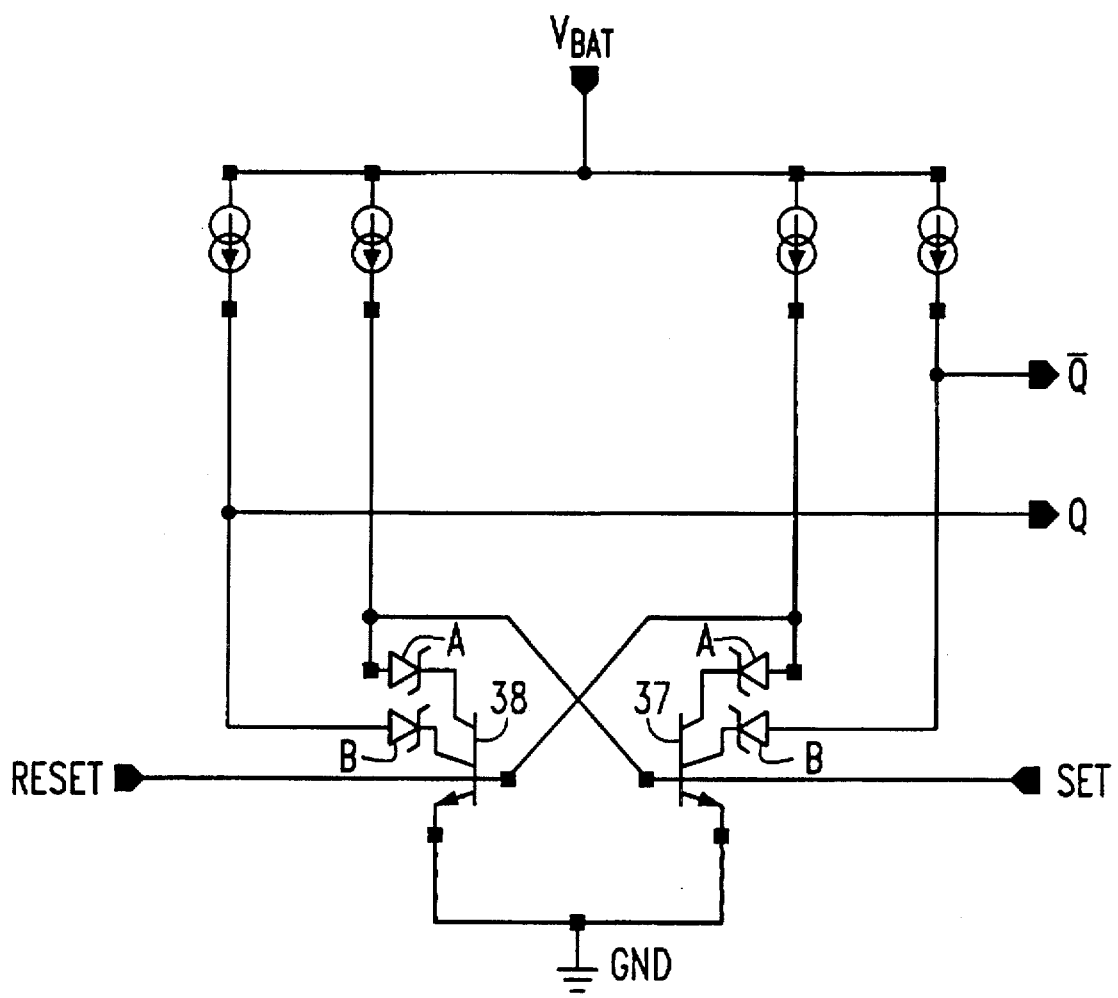
FIG. 2 is a schematic diagram illustrating an example of the flip-flop circuit in FIG. 1.

In circuit 10, flip-flop 26 may be simpler than standard flip-flop circuits, as stated earlier. Referring to FIG. 2, an example circuit of a simpler implementation of flip-flop 26 is shown. This implementation is appropriate if the chosen IC process is a bipolar process and the logic that follows the flip-flop is of a "Schottky Transistor Logic" (STL) type. The flip-flop has two cross-coupled NPN transistors 37 and 38, such that a collector (Schottky contact) A of each transistor is connected to the base of the other transistor. Both collector (Schottky contacts) A and B of each transistor are connected to constant current sources, and the emitters of the transistors are tied to ground. The set and reset inputs are connected to the base of transistors 37 and 38, respectively. The two complimentary outputs, $\bar{Q}$ and Q, are connected to collector B of transistors 37 and 38, respectively.

The flip-flop of FIG. 2 operates in circuit 10 as follows. In the first case the load (11 in circuit 20) is driven positive until the zener voltage of zener diode 28 is reached. This causes base current to flow into the base of NPN transistor 34 in circuit 27 which causes the reset input of the flip-flop to be pulled low. When the reset input of the flip-flop is pulled low, transistor 38 is turned off. Once transistor 38 is turned off both collector contacts rise as a result of the constant current sources. When collector A reaches a voltage level of 1 Vbe, transistor 37 turns on. With transistor 37 on, the base of transistor 38 is held low by the connection to transistor 37 collector A. This cross-connection of collector A of each transistor provides the two stable states of the flip-flop. The setting of the flip-flop is accomplished in a like manner by pulling the set input low which causes the flip-flop to enter the opposite state. Thus the logic level output voltages are 1 Vbe or about 0.6 volts for a high level and a Vsat+V(schottky) or about 0.3 volts for a low. The constant current sources can be formed by PNP current mirrors in a bipolar process or by high value resistors. In a CMOS process the flip-flop can be formed by cross-coupled inverters.

The implementation of the present invention shown in FIG. 1 is shown using bipolar transistor devices, however a MOS implementation, such as shown in FIG. 2 of the Kindlmann Patent, may also be used to remove their dependency on a low frequency clock signal.

From the foregoing description, it will be apparent than there has been provided improved circuit for driving an EL-lamp. Variations and modifications in the herein described circuit, in accordance with the invention, will undoubtedly suggest themselves to those skilled in the art. Accordingly, the foregoing description should be taken as illustration and not in a limiting sense.

I claim:

1. A circuit for repeatedly switching current through an inductor for driving an electroluminescent lamp at alternating voltage levels having both peak positive and peak negative polarities, comprising:

a circuit path having two zener diodes in series connection with said lamp, said zener diodes each having anode and cathode terminals, and a breakdown voltage, and said zener diodes having a pair of identical said terminals connected together;

said zener diodes causing conduction along the circuit path in a first direction when a positive voltage driving the lamp exceeds the breakdown voltage of a first of said two zener diodes to provide a peak detection signal representing that the lamp has reached the positive peak positive polarity voltage level, and said zener diodes causing conduction along the circuit path in a direction opposite the first direction when a negative voltage driving the lamp exceeds the breakdown voltage of a second of said two zener diodes to provide a negative peak detection signal representing that the lamp has reached the peak negative polarity voltage level; and means, coupled to said circuit path, for switching the polarity of the voltage driving the lamp to a negative polarity in response to the positive peak detection signal, and switching the polarity of the voltage to the lamp to a positive polarity in response to the negative peak detection signal.

2. The circuit according to claim 1 further comprising:

a supply terminal;

a ground terminal;

said inductor having first and second terminals;

a first switch coupled between said supply terminal and the first terminal of said inductor, said first switch operating responsive to a first input signal;

a second switch coupled between said ground terminal and said second terminal of said inductor, said second switch operating responsive to a second input signal;

a third switch coupled between the first terminal of said inductor and the lamp for controlling a first unidirectional current path from said lamp to the first terminal of said inductor responsive to current charging from said inductor along the first path; and a fourth switch coupled between the second terminal of said inductor and the lamp for controlling a second unidirectional current path from said second terminal of the inductor to said lamp responsive to current discharging from said inductor along the second path.

3. The circuit according to claim 2 wherein said means for the switching further comprises:

an oscillator providing an output signal;

a flip-flop having a first output, a second output opposite said first output, a set input, a reset input, and a triggering circuit for applying a signal to one of the two inputs;

said circuit path being connected to said lamp and said input circuit with said two zener diodes between said lamps and input circuit;

an AND gate having two inputs and an output signal applied to the first input signal of said first switch, one of said inputs of said AND gate is coupled to the second output of said flip-flop, and the output signal of the oscillator is applied to the other said input of said AND gate; and a NAND logic device having two inputs and an output signal applied to said second input signal of said second switch, one of said inputs of said NAND gate is coupled to the first output of said flip-flop, and the output signal of the oscillator is applied to the other said input of said NAND gate.

4. The circuit according to claim 2 wherein said first switch comprises a PNP transistor having an emitter coupled to said supply terminal, a collector coupled to said first terminal of said inductor, and a base for receiving said first input signal.

5. The circuit according to claim 2 wherein said second switch comprises a NPN transistor having an emitter coupled to said ground terminal, a collector coupled to said second terminal of said inductor, and a base for receiving said second input signal.

6. The circuit according to claim 2 wherein said third and fourth switches comprises auto-triggering SCRs.

7. The circuit according to claim 3 wherein said flip-flop further comprises two cross-coupled transistors coupled to said inputs and said outputs.

8. A circuit for repeatedly switching current through an inductor for driving an electroluminescent lamp at alternating voltage levels having both peak positive and peak negative polarities, comprising:

a circuit path having two zener diodes in series connection with said lamp, said zener diodes each having anode and cathode terminals, and a breakdown voltage, and said zener diodes having a pair of identical said terminals connected together;

said zener diodes causing conduction along the circuit path in a first direction when a positive voltage driving the lamp exceeds the breakdown voltage of a first of said two zener diodes to provide a peak detection signal representing that the lamp has reached the peak positive polarity voltage level, and said zener diodes causing conduction along the circuit path in a direction opposite the first direction when a negative voltage driving the lamp exceeds the breakdown voltage of a second of said two zener diodes to provide a peak detection signal representing that the lamp has reached the peak negative polarity voltage level; and a polarity control circuit coupled to said zeners for alternately applying driving voltages of opposite polarity to the lamp in response to the peak detection signals.

9. The circuit according to claim 8 wherein said polarity control circuit comprises:

a flip-flop for alternately coupling positive and negative driving voltages to the lamp in response to the peak detection signals.

* * * * *